United States Patent [19]

Telang et al.

[11] 3,890,069

[45] June 17, 1975

[54] COATING FOR ROTARY ENGINE ROTOR HOUSINGS AND METHOD OF MAKING

[75] Inventors: Yeshwant P. Telang, Grosse Ile; James C. Uy, Dearborn Heights, both of Mich.

[73] Assignee: Ford Motor Company, Dearborn, Mich.

[22] Filed: July 5, 1973

[21] Appl. No.: 376,862

[52] U.S. Cl. .............. 418/178; 29/156.4; 117/71 M; 117/93.1 PF; 418/61 A
[51] Int. Cl. ............................................. F04c 1/08
[58] Field of Search .............. 418/178, 179, 61 A; 29/191, 196.2, 197

[56] References Cited
UNITED STATES PATENTS

| | | | |
|---|---|---|---|
| 3,239,135 | 3/1966 | Fritz | 418/179 |
| 3,394,877 | 7/1968 | Hantzsche et al. | 418/178 |
| 3,608,535 | 9/1971 | Winston | 418/178 |
| 3,674,544 | 7/1972 | Grosseau | 117/93.1 PF |
| 3,705,818 | 12/1972 | Grosseau | 117/71 M |

*Primary Examiner*—C. J. Husar
*Attorney, Agent, or Firm*—Joseph W. Malleck; Keith L. Zerschling

[57] ABSTRACT

A rotor housing for a rotary internal combustion engine is disclosed having a wear-resistant coating system characterized by high temperature hardness stability and controlled porosity to improve the lubricating characteristics of the surface-to-surface engagement with the rotary apex seals. The coating system comprises a self-fused composite of martensitic stainless steel powder and an equally hard powder consisting of a nickel-based alloy. Powder particle size is controlled to render a smoother machined surface and sub-surface porosity. An intermediate transition coating may be used consisting of a composition selected from nickel aluminide, arc sprayed nickel, molybdenum, all effective to operate as a bonding intermediate to a supporting aluminum structure.

A method of producing the wear-resistant coating system for a rotor housing is disclosed, comprising preparation of an aluminum casting having a supporting epitrochoid end wall, machining a reference, embedment of thermally resistant plugs about certain openings in the end wall, removing a uniform layer of said casting end wall to a predetermined depth, soft grit blasting of the removed surface, coating of the margins about ports in the end wall with an anti-bond material flame spraying the entire end wall with a mixture of martensitic stainless steel and a nickel-based alloy, immersing said coated casting in oil for a predetermined period of time immediately after coating, and grinding off a portion of said coating to the depth of said reference.

12 Claims, 4 Drawing Figures

3,890,069

COATING FOR ROTARY ENGINE ROTOR HOUSINGS AND METHOD OF MAKING

BACKGROUND OF THE INVENTION

One of the most difficult problems to overcome in connection with interengagement between the rotor seals and the rotor housing of a rotary engine is the ability to retain a sufficient but limited amount of lubrication therebetween while at the same time provide a smoother machined surface.

Another difficult problem unique to the rotor housing of a rotary engine, is necessity for openings in the epitrochoid wall engaged by the seals, such openings comprising exhaust and intake parts, and sparking means. Severe wear and destruction occurs about these openings after a predetermined use. Yet still other problems entail providing a rotor composition which is both high in thermal conductivity and has a high hardness stable at elevated operating temperatures.

Prior art materials used for rotor housings have comprised electrolytically plated nickel-silicon carbide on an aluminum casting, chrome plating over a powder-sprayed steel coating on an aluminum casting. Each are unable to overcome the problems mentioned above and in addition the nickel-silicon carbide material is extremely difficult to grind thereby raising fabricating costs, and the chromium material requires a very slow and expensive application procedure as well as presenting pollution problems in disposal of plating wastes.

SUMMARY OF THE INVENTION

The principal object of this invention is to provide an improved rotor housing having a coating system which has controlled porosity within a limited range for optimizing the lubrication system that is needed in the rotor contact areas and which has an enhanced smooth machined surface.

Another object of this invention is to provide a rotor housing having a coating system which is capable of permitting the use of other materials on apex seals which interengage with the rotor housing.

Another object is to provide a rotor housing coating system which is particularly characterized by low coefficient of friction during operating conditions, and has a unique solidification structure for attaining high hardness stability at elevated temperatures.

Other objects concern providing a coating system which is economical in the method of application as well as overall material costs, and an improved method for applying the wear resistant material.

DETAILED DESCRIPTION

Figure 1:
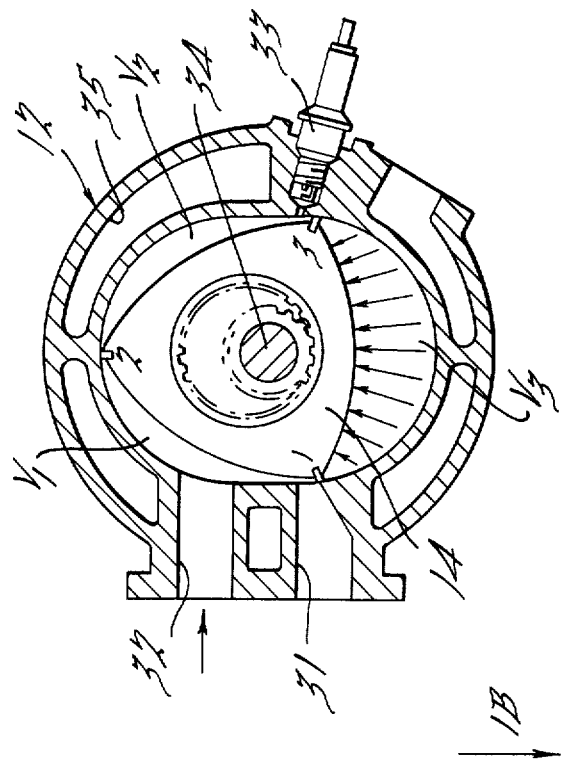
FIG. 1 is a composite of views illustrating operative positions of a rotor in a rotor housing of a rotary internal combustion engine, the housing employing the coating system of this invention.
Figure 1:
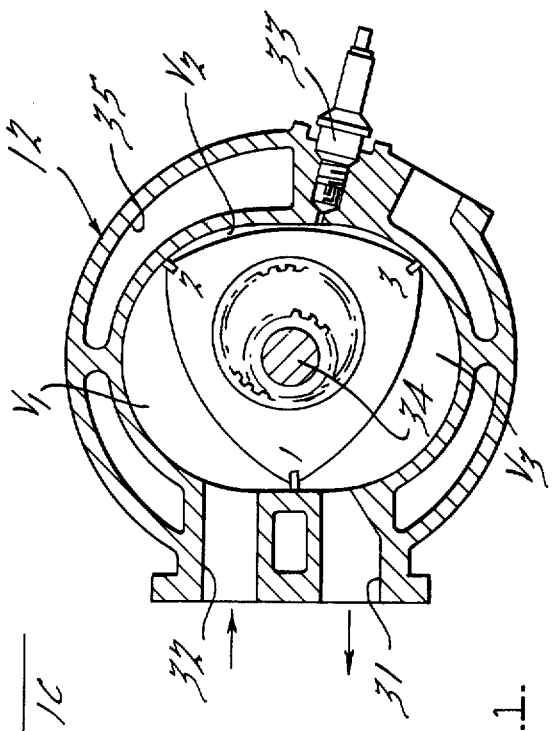
Figure 1:
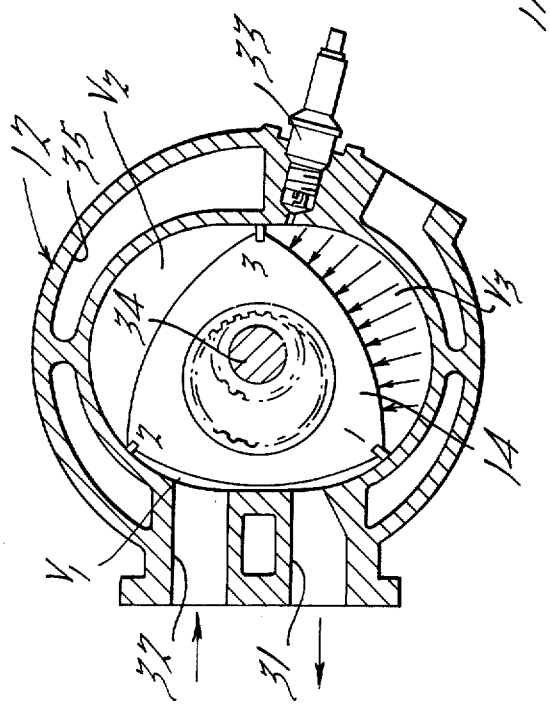
Figure 1:
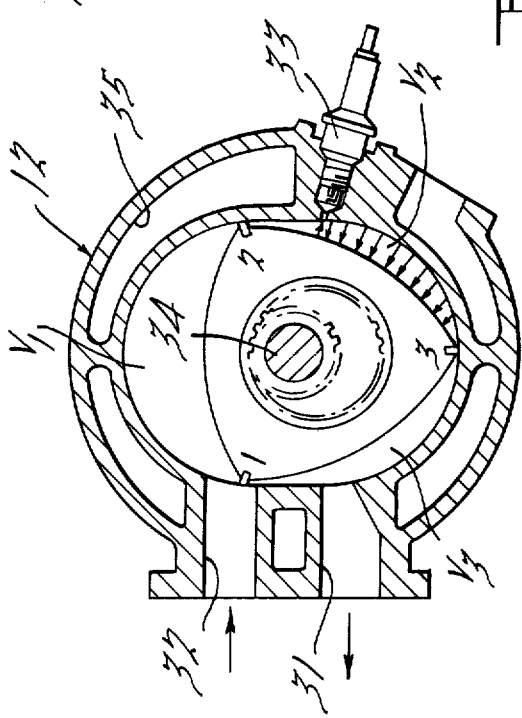
Figure 2:
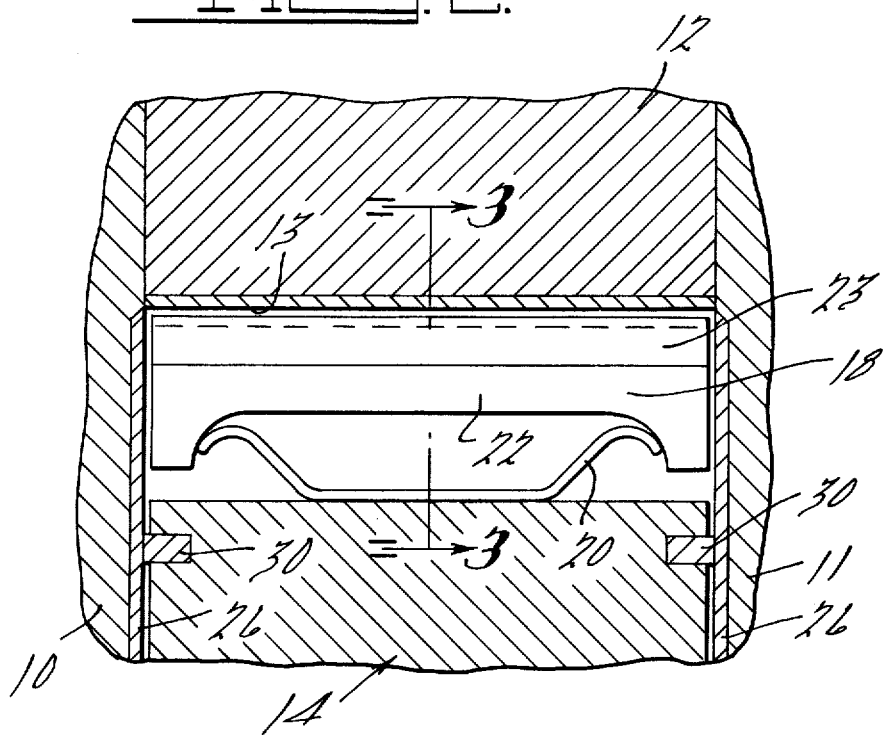
FIG. 2 is a fragmentary enlarged sectional view of a portion of a rotor, rotor housing, including side housings, showing the relative coating systems employed.
Figure 3:
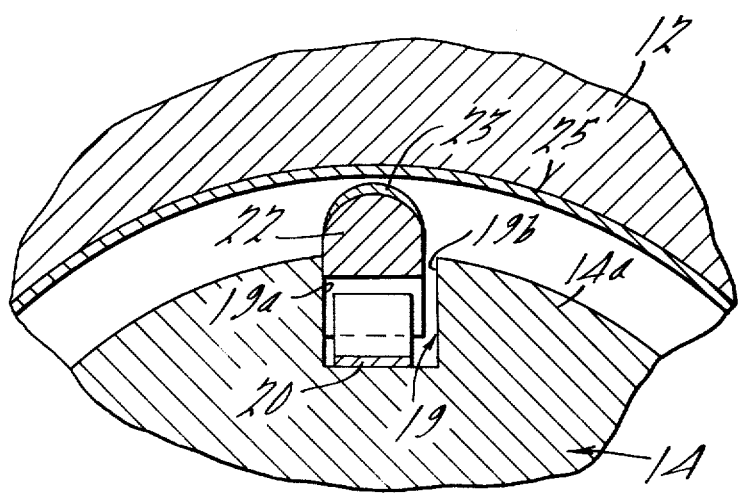
FIG. 3 is a view taken substantially along line 3—3 of FIG. 2.

Turning now to FIGS. 1–3, there is shown a part of a typical rotary internal combustion engine. In FIG. 1, the engine is illustrated during four principal cycles of operation: exhaust 1a, intake 1b, compression 1c and expansion 1d. The engine has side housings 10 and 11 which together with a rotor housing 12 defines a chamber for movement of a rotary piston 14 therein. The piston 14 has three apices 14a each having a slot 19 within which an apex seal 18 is loosely disposed; the seal is defined as a strip with a supporting portion 22 and a wear-resistant portion 23. The strip is urged by gas pressure to seal sequentially against sides 19a and 19b of the slot and against a epitrochoid wall 13 of the rotor housing 12. A mechanical spring 20 assists in urging the strip outwardly against the rotor housing. Side seals 30 are carried on each side of the rotor to operatively seal against a coating 26 carried by the side housings 10 and 11.

A coating system 25 is employed herein across the entire epitrochoidally shaped end wall 13 of the rotor housing. An improved coating system is required because of the severe and unusual problems associated with the end wall. For example, the end wall experiences highly uneven heat distribution which severely taxes the strength, hardness and lubricity capabilities of prior art materials. As shown in 1a, the engine is completing the exhaust cycle in chamber V1 between apex seals 1 and 2; it is undergoing maximum expansion of combusted gases in chamber V3 between apex seals 3 and 1. Note that chamber V1 is just beginning the intake stroke through intake port 32 and completing exhaust through port 31; the piston is in the port overlap position with both opening into a recess in the rotor. In 1b the eccentric shaft 34 has rotated 90° from 1a with the intake volume (fuel, air and oil) of chamber V1 gradually increasing. In 1c, chamber V1 attains a further increase and finally in 1d maximum volume is attained as the piston apex seal 3 passes bottom dead center. The intake stroke ends when the tip of apex seal 1 passes the upper end of the intake port 32. At the same time chamber V2 is undergoing compression and finally ignition in 1d. Chamber V3 is undergoing rapid expansion and substantial exhaust.

The portion of the rotor end wall 13, adjacent the ignition means 33, experiences the hottest temperatures of the rotor housing. This results in spite of the fact that the rotor housing is comprised of a highly heat conductive material, such as aluminum, and a water cooling system 35 is defined throughout the rotor housing. The drastic fluctuation in gas pressure adjacent the ignition means has a destructive effect on the rotor housing end wall. In addition, prior coating systems surrounding the margin of ports 31 and 32 experience a peeling effect whereby adherency with the rotor housing is lost. Most importantly, inadequate porosity of prior rotor housing coatings has caused a decrease in lubricity leading to excessive wear of apex seals. However, inability of prior coatings to maintain a high hardness at elevated temperatures causes sealing failure in spite of adequate oil lubrication.

To meet these problems, the coating system 25 comprises a self-fused powder metal composite of generally equally hard particle types, one type consisting of martensitic stainless steel and the other type consisting of a nickel-based alloy. The composite is deposited by thermal spraying onto all of the rotor housing end wall 13 (preferably comprised of aluminum) and preferably an intermediate thermally sprayed transition coating is employed. The powders are admixed preferably in a 1:1 ratio for thermal spraying. The martensitic stainless steel should have a chromium content of 12–17%; preferably a 420 stainless steel having about 13% chromium with the remainder substantially iron. The nickel-based alloy should comprise 2–10% iron, at least 70% nickel and additions of 2–6% silicon with 1.5–5% boron. The addition of boron and silicon is critical to forming a hard self-fused composite of discrete powder types. Silicon and boron are dissolved in the nickel-based alloy powder; since they have a lower melting temperature than other constituents in the alloy powder, they come out of solution during thermally spraying as low melting eutectics to form a fluidized surface for the particles, thus fluxing the composite.

It is important that the coating system 25 have an extra smooth finished surface to reduce wear, while at the same time a controlled porosity in the range of 4–8% should be incorporated to provide a sub-surface reservoir of oil to supply a lubricant film on the exposed portion of the coating system. These goals are somewhat contradictory, but can be attained successfully by controlling the particle size of the starting ingredients to no larger than 200 mesh (preferably –200, +325 mesh) controlling the flow of gases (such as oxygen and acetylene in an oxy-acetylene gun) which impel the powder particles against the surface to be coated. Control of these two parameters leads to a coating which can be machined with less microscopic or particle pullout and yet have an adequate porosity for oil retention.

Since the coating system will be subject to uneven and isolated high temperatures, the indicated chemistry of the powder particle types must be observed to achieve a stable hardness level of at least $R_c$ 30 at operating temperatures of 400°F. Such hardness stability is important to reducing "chatter" which results in poor sealing efficiency and poor engine operation. Chatter is a visible series of transverse lines appearing at two zones of the rotor end wall and which probably result from the apex seals repeatedly gouging a slight depression in the rotor coating system during each rotor revolution. The apex seals are subject to a varying radial outward bias which is comprised of gas pressure, inertial forces and a mechanical spring 20. The total radial load on the apex seal reaches 280 pounds in certain zones and can impose localized stress or friction on the rotor end wall coating. To successfully withstand these varying apex seal loads, the composite coating herein has excellent hardness stability at high temperatures. Furthermore, the coating system has excellent metallurgical compatibility with apex seal compositions such as tungsten carbide, plating of nickel-silicon carbide and chrome plating.

To provide a total optimum metallurgical system for the rotor housing, the cast housing support should be comprised of aluminum having a high thermal conductivity factor and preferably should have an analysis of 16–18% silicon, 0.5% max. carbon, 0.45–0.65% magnesium, 0.75% max. titanium and the remainder iron. The intermediate transition coating should have a composition selected from the group consisting of nickel aluminide, arc sprayed nickel and molybdenum—all within a thickness range of 1–8 mils and preferably 5–7 mils.

Figure 4:
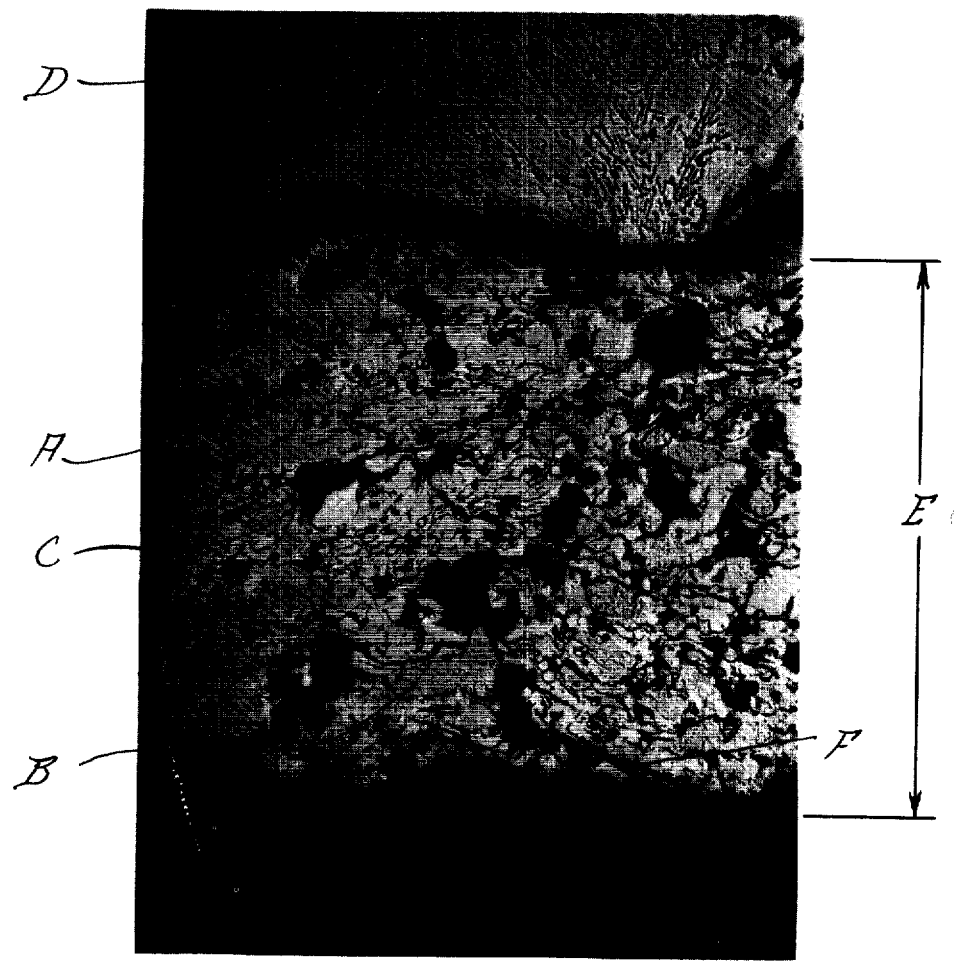
FIG. 4 is a micro photograph of the coating system of this invention.

As shown in FIG. 4, the coating system herein has a unique solidification structure comprised of generally spherical particles A of martensitic stainless steel and acicular particles B of the nickel-based alloy, variously sized voids or pores C, all adhered to the aluminum alloy substrate D. The coating system has a deposited thickness of 0.02–0.03 inches, but is machined to a finished thickness E of about 0.01–0.02 inches, preferably 0.015 inch. FIG. 1 illustrates the microstructure under a 100x magnification, the surface having been etched with 10% nitric acid. The interlocked elongated alloy particles with spherical stainless particles render a more wear-resistant coating. Controlled areas F of oxides or interstitial oxygen add to this wear resistance.

Turning now to a preferred method of fabricating the wear-resistant coating system and rotor housing, the steps comprise:

1. Substrate Preparation

A casting is prepared for defining a rotor housing carrying a supporting epitrochoid end wall 13 having appropriate intake and exhaust ports as well as an opening for receiving ignition means. The casting is formed using an aluminum A-390 alloy comprised of 16–18% silicon, 0.5 maximum iron, 0.45–0.65 magnesium, 0.2 maximum titanium. The casting is aged at 400°F to a Brinell hardness between 90–110. The margin about the opening for receiving the ignition means is recessed and a carbon or copper plug is inserted; the plug projects beyond the surface of end wall 13. Also the margins (to about 0.05 inch) about the intake and exhaust ports is coated with an anti-bond material so the imposed spray coating will not extend to the edge of the ports, but rather will be protected by tapering to a close spaced from the ports.

The casting inner surface is milled to define a reference and is then subjected to a machining operation whereby the entire inner surface of end wall 13 is removed or undercut to a depth of approximately 0.05 inches and to a surface finish of 64–256 micro inches. The undercut is carried out so that approximately 0.12 inches of aluminum stock is retained on each flat side before spraying as a reference surface. The carbon or copper plug is machined off to the same depth as the principal end wall.

The machined surface is subject to a soft grit blasting of between 30–64 grit and by use of a low air pressure of about 40 psi.

2. Spraying

An intermediate transition coating of nickel aluminide is flame sprayed onto the prepared surface to a thickness of 5–8 mils. An oxygen-acetylene flame (or plasma) gun is mounted for movement so as to spray the powder mixture onto the prepared surface at a biased direction substantially normal to the prepared surface, the gun being held adjacent but outside the epitrochoid end wall. The disposition of the gun is necessitated by maintaining the distance between the gun and surface to be coated no less than 12 inches and about 10 inches. Prior to the flame spray coating treatment, the casting is preheated to a temperature approximately 200°F. A 1:1 mixture of martensitic stainless steel and nickel-based alloy powders are delivered to the gun as a feed material. The mixture ratio may be varied as much as 3:1. The acetylene pressure for carrying out the spraying treatment is at about 15 psi and an oxygen pressure of about 24 psi is maintained. The flow of acetylene is about 30% and oxygen about 70%. The coating is continuously built up by the spray technique to a thickness of about 0.025 inches which allows for later removal back to the reference.

3. Finish Treatment

The coated casting is then immersed immediately in oil for preventing the grinding coolant from subsequently penetrating. The sprayed coating is machined to remove a layer thereof to a depth of about 0.010 leaving the finished admixed coating thickness at about 0.015 inches.

Features of the fabricating method include use of carbon or copper plugs, coating of the port margins with an anti-bond material soft grit blasting, use of a selected intermediate transition coating, and controlled angular disposition of spray gun for constant spray distance.

We claim:

1. A wear and chatter resistant coating system for the rotor housing of a rotary internal combustion engine, the system comprising:
   a. a support portion comprised of a material having a thermal conductivity factor at least equivalent to aluminum, and
   b. an outer exposed portion comprised of an admixture of generally equally hard powder particle types, one type comprising martensitic stainless steel and the other type comprising a nickel-based alloy, said powder particles being surface fused to form a coating network, said starting powder particle types are uniformly limited to less than 200 mesh for providing an improvement in machined smoothness of said exposed portion.

2. The system as in claim 1, in which the deposited particles exhibit a solidification structure whereby the martensitic stainless steel particles appear as spheres, the nickel-based alloy particles appear acicular and oxides or interstitial oxygen exist as randomly oriented pockets.

3. The system as in claim 1, in which the porosity of said exposed layer varies from about 9% at the base of the exposed layer to about 6% at the exposed surface of the exposed layer.

4. The system as in claim 1, in which said nickel-based alloy comprises 2.0–8.0% silicon and 1.5–4.5% boron.

5. In a rotary internal combustion engine having a combustion chamber arranged for planetary movement of a rotor therein, the improvement comprising:
   a. means defining an epitrochoid shaped supporting end wall forming part of said combustion chamber and adapted for continuous engagement by the extremities of said rotor, and
   b. a coating system metallurgically bonded to substantially the entire internal surface of said end wall, said system comprising a wear-resistant layer for interengagement with said rotor and an adherency transition layer interposed between said supporting end wall and said wear-resistant layer, said wear-resistant layer consisting essentially of a surface-fused mixture of martensitic stainless steel and a nickel-based alloy.

6. The improvement as in claim 5, in which said intermediate layer comprises a composition selected from the group consisting of nickel aluminide, arc sprayed nickel and molybdenum.

7. The improvement as in claim 5, in which said structure further comprises means for maintaining a positive supply of oil across the entire exposed surface of said rotor housing, said rotor housing having an operative dynamic coefficient of friction in the range of 0.005 to 0.02.

8. In a rotary internal combustion engine having a combustion chamber arranged for planetary movement of a rotor therein, the combination comprising:
   a. a rotor housing defining an epitrochoid shaped supporting end wall,
   b. a rotor carrying a plurality of apex seals effective to continuously engage the rotor housing during planetary movement, each seal presenting an engaging surface comprised of a composition selected from the group consisting of cast iron, aluminum-carbon, tungsten carbide, electroplated composite of nickel-silicon carbide and chromium,
   c. a coating system metallurgically bonded to substantially the entire surface of said rotor housing end wall, said coating system comprising an exposed wear-resistant layer for engagement by said rotor seals, said exposed layer consisting essentially of a self-fused powder composite of martensitic stainless steel and a nickel-based alloy having a hardness generally equal to said stainless steel, said composite having a hardness value of at least Rockwell C 30 at an elevated operating temperature of 400°F.

9. The combination as in claim 8, in which said rotor housing has at least opening in said end wall for receiving means to ignite a combustible mixture in said combustion chamber, and an annular plug being recessed in said end wall about said opening and consisting essentially of carbon.

10. The combination as in claim 9, in which said plug consists essentially of copper.

11. The combination as in claim 9, in which the housing further contains an exhaust port at one location in the surface of said supporting end wall, said coating system being absent from a predetermined margin of said port.

12. The system as in claim 1, in which said coating system has a generally uniform thickness in the range of 0.01–0.03 inch.

* * * * *